(12) United States Patent
Robert et al.

(10) Patent No.: US 9,124,906 B2
(45) Date of Patent: Sep. 1, 2015

(54) SYSTEM AND METHOD FOR SIMPLIFYING DISCOVERY OF CONTENT AVAILABILITY FOR A CONSUMER

(75) Inventors: Arnaud Robert, Simi Valley, CA (US); Edward C. Drake, Stevenson Ranch, CA (US); William Bartley, Venice, CA (US)

(73) Assignee: Disney Enterprises, Inc., Burbank, CA (US)

( * ) Notice: Subject to any disclaimer, the term of this patent is extended or adjusted under 35 U.S.C. 154(b) by 133 days.

(21) Appl. No.: 12/930,944

(22) Filed: Jan. 19, 2011

(65) Prior Publication Data

US 2011/0307830 A1    Dec. 15, 2011

Related U.S. Application Data

(60) Provisional application No. 61/397,445, filed on Jun. 11, 2010.

(51) Int. Cl.
| | |
|---|---|
| *G06F 3/048* | (2013.01) |
| *H04N 21/472* | (2011.01) |
| *H04N 21/231* | (2011.01) |
| *H04N 21/25* | (2011.01) |

(Continued)

(52) U.S. Cl.
CPC ......... *H04N 21/23109* (2013.01); *H04N 21/25* (2013.01); *H04N 21/25841* (2013.01); *H04N 21/44222* (2013.01); *H04N 21/4508* (2013.01); *H04N 21/4524* (2013.01); *H04N 21/4532* (2013.01); *H04N 21/4668* (2013.01); *H04N 21/482* (2013.01)

(58) Field of Classification Search
CPC ....................................................... G06F 3/048
USPC ........................................................... 715/810
See application file for complete search history.

(56) References Cited

U.S. PATENT DOCUMENTS

| | | |
|---|---|---|
| 6,335,730 B1 | 1/2002 | Gould |
| 7,386,517 B1 | 6/2008 | Donner |

(Continued)

OTHER PUBLICATIONS

Nabyla Daidj et al. "Positioning of Firms on an E-business Value Chain: The case of Video on Demand." (Conference: The Fourth International Conference of Electronic Business—Shaping Business Strategy in a Networked World (ICEB2004)/ Beijing, Jan. 2004, p. 1313-1318).*

(Continued)

*Primary Examiner* — Jennifer To
*Assistant Examiner* — Xuyang Xia
(74) *Attorney, Agent, or Firm* — Farjami & Farjami LLP

(57) ABSTRACT

There is presented a system and method for simplifying discovery of content availability for a consumer. The system comprises a content availability database storing content records accessible through a server, and an aggregator configured to update the content records. The system also comprises a content discovery application configured to display an information pane corresponding to one of the content records according to a data related to the consumer, the information pane including one or more selectable display features indicating the distribution status of a content unit corresponding to the content record. The content discovery application is further configured to receive an input from the consumer selecting one of the selectable display features indicating distribution status and to identify at least one provider of the content unit according to the selected distribution status.

24 Claims, 7 Drawing Sheets

(51) Int. Cl.
  H04N 21/258   (2011.01)
  H04N 21/442   (2011.01)
  H04N 21/45    (2011.01)
  H04N 21/466   (2011.01)
  H04N 21/482   (2011.01)

(56) References Cited

U.S. PATENT DOCUMENTS

| | | | |
|---|---|---|---|
| 7,415,424 B1 | 8/2008 | Donner | |
| 7,890,490 B1* | 2/2011 | Bovenschulte et al. | 707/708 |
| 2004/0204820 A1* | 10/2004 | Diaz | 701/200 |
| 2005/0005241 A1* | 1/2005 | Hunleth et al. | 715/720 |
| 2006/0218604 A1* | 9/2006 | Riedl et al. | 725/91 |
| 2007/0022464 A1 | 1/2007 | Dean | |
| 2007/0088616 A1 | 4/2007 | Lambert | |
| 2007/0297766 A1 | 12/2007 | Ando | |
| 2008/0015933 A1 | 1/2008 | McKenna | |
| 2008/0109323 A1 | 5/2008 | Leach | |
| 2008/0109345 A1 | 5/2008 | Leach | |
| 2008/0147503 A1* | 6/2008 | Brooks | 705/14 |
| 2008/0243532 A1 | 10/2008 | Leach | |
| 2008/0307530 A1* | 12/2008 | Lee et al. | 726/26 |
| 2009/0006184 A1 | 1/2009 | Leach | |
| 2009/0006955 A1* | 1/2009 | Wang et al. | 715/702 |
| 2009/0070249 A1 | 3/2009 | Leach | |
| 2009/0119172 A1 | 5/2009 | Soloff | |
| 2009/0132953 A1* | 5/2009 | Reed et al. | 715/781 |
| 2009/0319672 A1* | 12/2009 | Reisman | 709/227 |
| 2010/0036717 A1 | 2/2010 | Trest | |
| 2010/0070888 A1 | 3/2010 | Watabe | |
| 2010/0088716 A1 | 4/2010 | Ellanti | |
| 2010/0146077 A1* | 6/2010 | Davies et al. | 709/219 |
| 2010/0185502 A1 | 7/2010 | Roberts | |
| 2010/0186025 A1* | 7/2010 | Thomas et al. | 725/5 |
| 2010/0251280 A1* | 9/2010 | Sofos et al. | 725/14 |
| 2011/0078715 A1* | 3/2011 | Chung et al. | 725/9 |
| 2011/0154382 A1* | 6/2011 | Chow et al. | 725/5 |

OTHER PUBLICATIONS

Anton Nijholt, The Twente Virtual Theatre Environment: Agents and Interactions. In: "Interactions in Virtual Worlds" (IVW'99), May 19-21, 1999, pp. 147-164. Twente Workshop on Language Technology 15 (0929-0672).

* cited by examiner

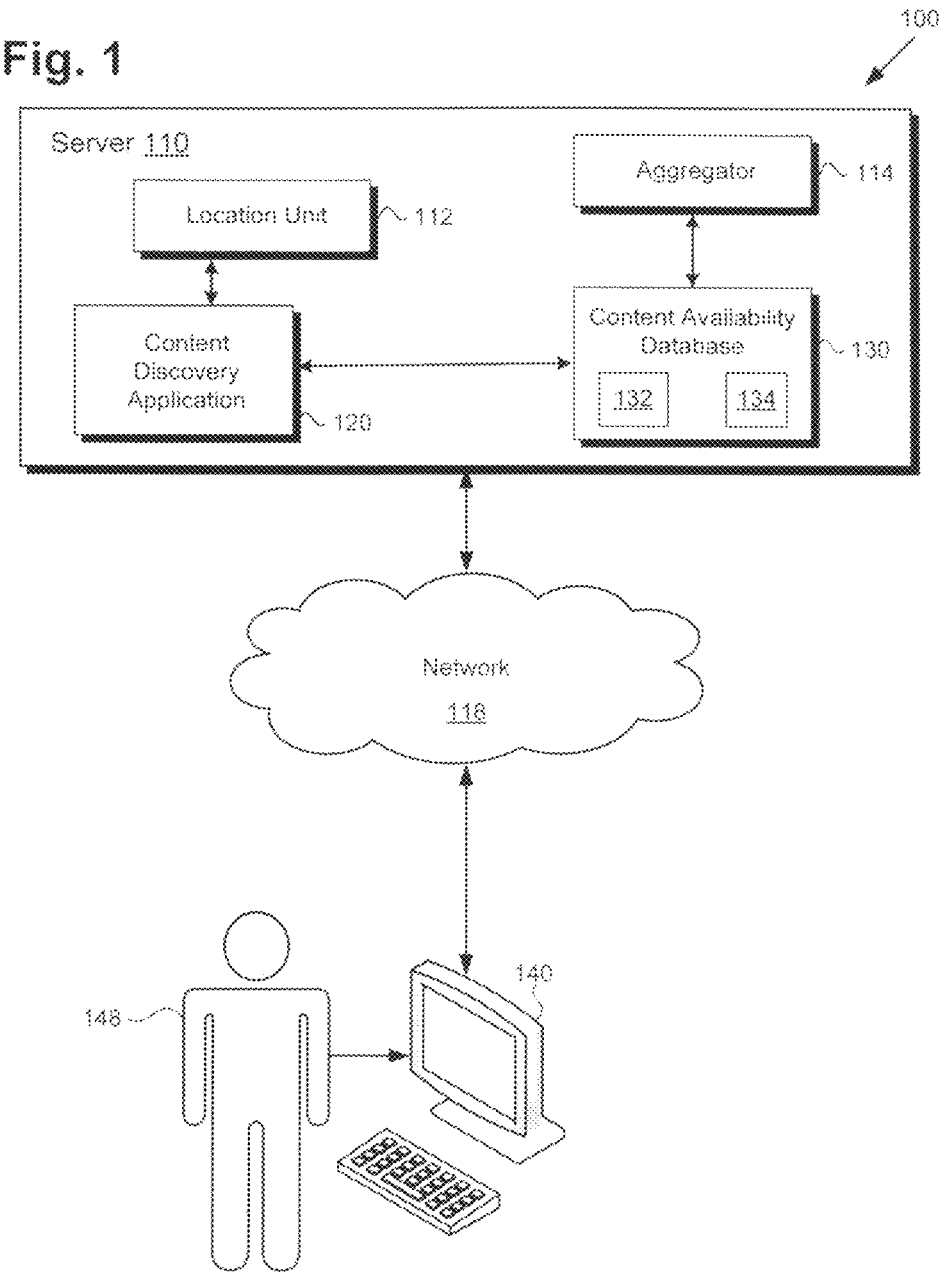

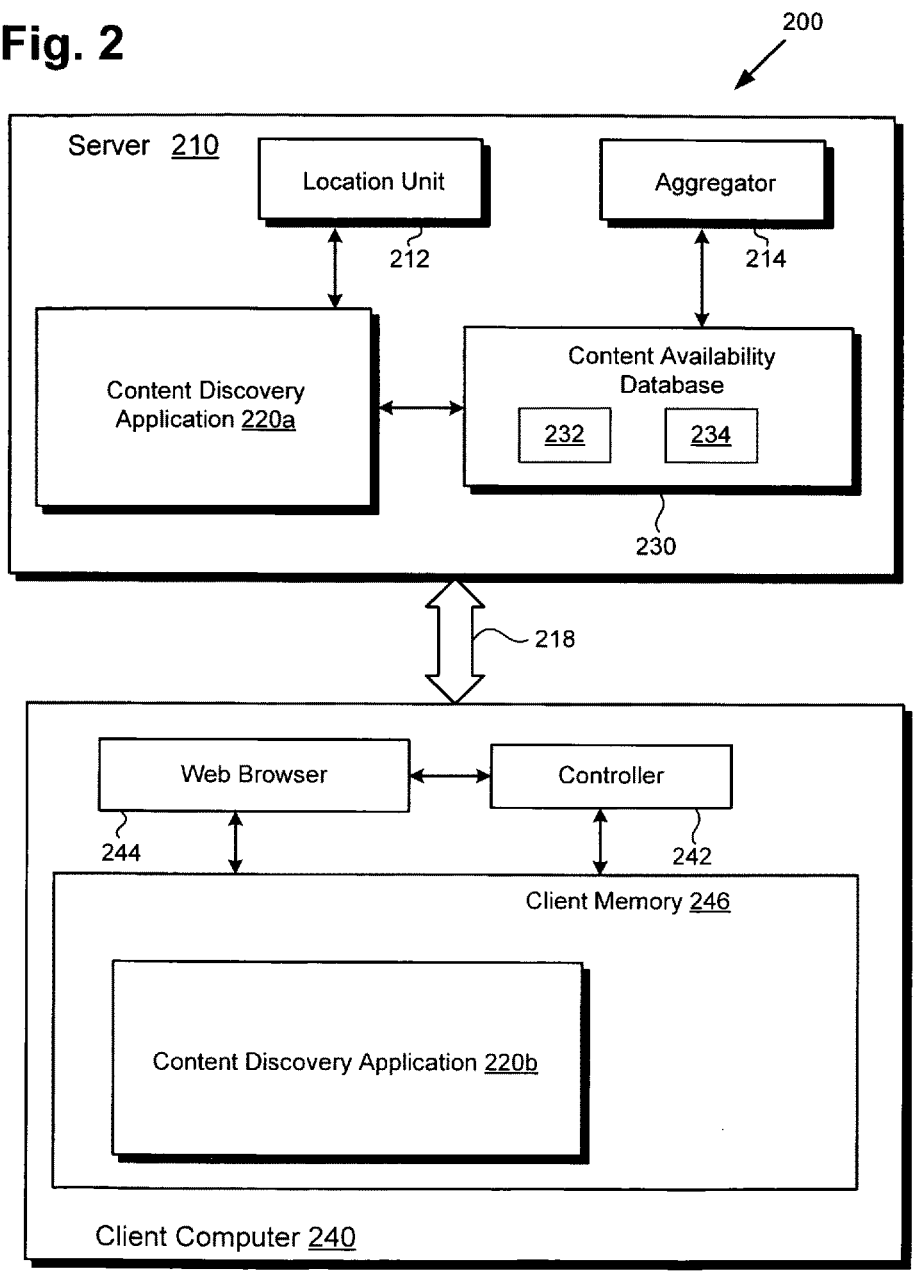

SYSTEM AND METHOD FOR SIMPLIFYING DISCOVERY OF CONTENT AVAILABILITY FOR A CONSUMER

RELATED APPLICATIONS

This application claims priority to U.S. Provisional Application No. 61/397,445, filed on Jun. 11, 2010, which is hereby incorporated by reference in its entirety.

BACKGROUND OF THE INVENTION

1. Field of the Invention

The present invention relates generally to searching for media content. More particularly, the present invention relates to computer mediated discovery of media content availability.

2. Background Art

Although modern communication technologies have made access to information easier than ever before, via the Internet, for example, that potential advantage is often partly offset by the challenges faced by a consumer in attempting to discover personally relevant information regarding the availability of a desired product or service. For example, consider the situation of a potential consumer of movie content utilizing a personal computer (PC) and to search for available movie content online. Movie content, such as content corresponding to a feature film, may be made available to the public through more than one mode of acquisition or consumption. For instance, a feature film may first be released for public consumption via a national theatrical window. During that initial period, the distribution status of the feature film content may limit consumers to viewing it in-theaters. That is to say, the distribution status during the theatrical release window may not include availability to the consumer in distribution forms other than as a theater based screening, such as in the alternative distribution forms of media content available as digital media, Video on Demand (VOD) content, or content recorded on physical media optical discs, for example.

After a period of time, the feature film content may move into a pay-per-view (PPV) window, and perhaps later into a home entertainment window. Based on the distribution status of the feature film content at a particular time, there may be one or more release windows associated with the content and one or more distribution forms associated with the content, as well as a number of additional factors that may affect or vary the distribution status. For example, a particular feature film may be "blacked out" from appearing in certain markets due to exclusive content rights negotiated by a provider of service to those markets. Moreover, physical media, such as a Digital Video Disc (DVD) or Blu-ray disc, may or may not be available from a desired retailer, and when available in principle, may or may not be in stock at a brick-and-mortar retail outlet local to the consumer. In addition, a feature film may simply be in-between release windows and may not be available to the general public at all during that period. The frequently complex rules and scheduling of such content release windows makes it difficult for a consumer to ascertain the availability of desired feature film content, and similarly opaque criteria may govern the availability of other types of content, such as literary and music content, for example.

Conventional approaches to ascertaining the availability of desired content are often ad hoc in nature and typically involve the consumer performing a heuristic search through the vast information repository accessible online to first discover, and then synthesize the various items of information necessary for an understanding of the distribution status of the content with respect to the consumer's locale. Such a process is likely to be mentally fatiguing, time consuming, and generally unpleasant for the consumer.

Accordingly, there is a need to overcome the drawbacks and deficiencies in the art by disclosing a solution wherein timely, relevant information regarding availability of desired content is collected and made discoverable by a consumer in an intuitive way.

SUMMARY OF THE INVENTION

There are provided systems and methods for simplifying discovery of content availability for a consumer, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 1 shows a block diagram of a system for simplifying discovery of content availability for a consumer, according to one embodiment of the present invention;

FIG. 2 shows a more detailed embodiment of a system for simplifying discovery of content availability for a consumer;

DETAILED DESCRIPTION OF THE INVENTION

Figure 3A:
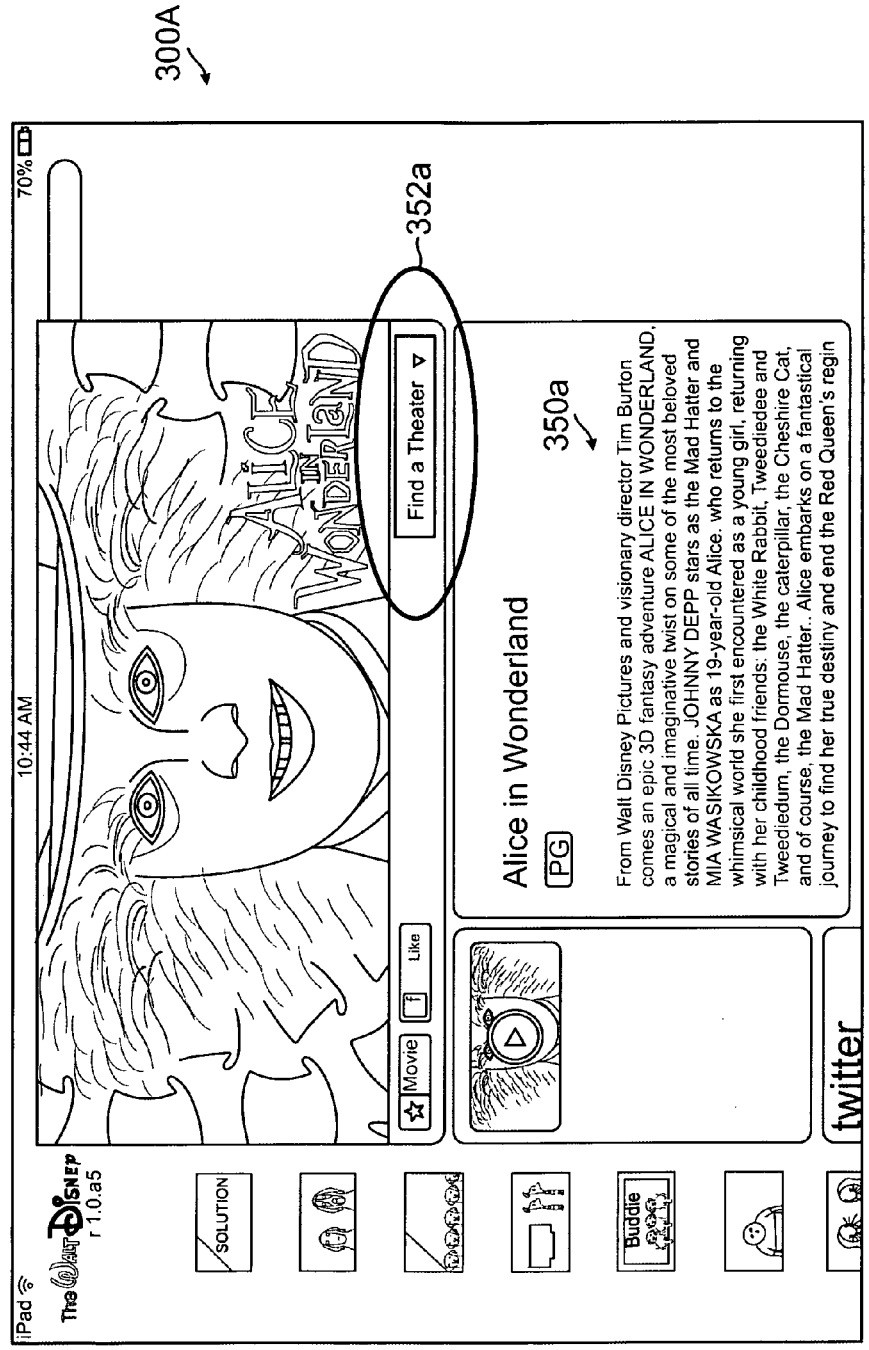
FIG. 3A shows a visual frame depicting an exemplary content information pane including a display feature indicating a distribution status of the content, according to one embodiment of the present invention.

The present application is directed to a system and method for simplifying discovery of content availability for a consumer. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 shows a block diagram of a system for simplifying discovery of content availability for a consumer, according to one embodiment of the present invention. In the embodiment of FIG. 1, system 100 comprises server 110 including location unit 112, aggregator 114, content discovery application 120, and content availability database 130 storing content records 132 and 134. Content records 132 and 134 are shown as merely representative entries in content availability database 130. As such, content records 132 and 134 are proxies for a plurality of content records, such as hundreds, thousands, or millions of content records, for example, stored in content availability database 130. Also included in FIG. 1 are network 118, client computer 140, and consumer 148.

It is noted that although client computer 140 is represented as a personal computer (PC) in FIG. 1, in other embodiments, client computer 140 may comprise another type of mobile or stationary personal communication device or system, such as a tablet computer, mobile telephone, personal digital assistant (PDA), gaming console, or home entertainment system, for example. It is further noted that although the embodiment of FIG. 1 depicts location unit 112, aggregator 114, content discovery application 120, and content availability database 130 as mutually residing on server 110 for conceptual clarity and economy of presentation, other arrangements are contemplated by the inventors.

For example, in other embodiments, some or each of location unit 112, aggregator 114, content discovery application 120, and content availability database 130 may be remote from one another but interactively linked in the manner shown in FIG. 1, over a communication network, such as network 118. In those latter embodiments, server 110 may be seen to correspond to multiple servers, such as two to four servers, for example, for supporting communication among location unit 112, aggregator 114, content discovery application 120, and content availability database 130. Moreover, in one embodiment, location unit 112 may be omitted from system 100 entirely.

According to the embodiment of FIG. 1, consumer 148 may utilize content discovery application 120, which may be downloaded to client computer 140 over network 118, for example, to access one or more of content records 132 and 134 stored in content availability database 130, in order to ascertain a distribution status of the content corresponding to those content records. Content records 132 and 134 may be periodically refreshed or updated by data provided from aggregator 112, which may, for example, pull Really Simple Syndication (RSS) data feeds according to one or more updating schedules. In addition, according to the specific embodiment shown in FIG. 1, content discovery application 120 can be configured to utilize location unit 112 to identify a geographical location associated with consumer 148, such as a location or address corresponding to communications received by server 110 from client computer 140, for example. As a result, content discovery application 120 can provide consumer 148 with information regarding the availability of content of interest to consumer 148 that is both substantially up-to-date and specific to the locale of consumer 148.

Content discovery application 120 may be configured to provide a consumer interface enabling consumer 148 to ascertain the availability of desired content by viewing, sorting, and selecting one or more graphical representations corresponding respectively to content records 132 and 134. Content discovery application 120 may utilize more than one visual array, and more than one combination of visually emphasized active graphical representations selectable by consumer 148 and visually de-emphasized inactive graphical representations not selectable by consumer 148, to enable consumer 148 to identify and access a desired content record. That is to say, a collection of content records corresponding to entertainment content such as books, music, feature films, or a television (TV) series or episode, for example, may be depicted by respective graphical representations and searched or filtered by consumer 148 utilizing content discovery application 120.

Various embodiments of the present invention allow consumer 148 to interact with content records that are represented graphically, and to filter the display characteristics of the graphically represented content records based on filtering criteria. The filtering organizes search results for easy viewing. According to one embodiment, the graphical representations are visual depictions corresponding to content records, such as content records 132 and 134. Content records 132 and 134 may include metadata about a integral unit of content such as a book, feature film, play, musical track or album, for example. The metadata may include substantially unchanging metadata such as the title of the content unit, actors or characters appearing in the content, an author, director, or creator of the content, a content description, or its runtime or rating, for example, to assist consumer 148 in filtering the content records so as to identify a record corresponding to a unit of desired content. In addition, the metadata may include updateable metadata such as the distribution status of the content in various regional distribution markets, as well as providers such as venues and retail outlets offering the content, and the cost of obtaining or enjoying the content from those providers, for instance.

For example, content discovery application 120 may be configured to display graphical representations corresponding to a plurality of content records including content records 132 and 134 in an inventory array, arranged in a grid pattern, for example, as active graphical representations selectable by consumer 148. In one embodiment, for example the content records might correspond to music singles and/or albums, and their graphical representations might take the form of thumbnails representing album or single cover art, or other key art. In the event that consumer 148 were to discover a single or album of interest by visual inspection of the thumbnails, consumer 148 can access metadata relevant to that music by selecting its respective representation, such as by executing a mouse click or providing a touch-screen input to the display of client computer 140.

In response to data related to consumer 148, such as an input corresponding to selection of a thumbnail representation of a particular feature film or movie by consumer 148, content discovery application 120 can be configured to determine the geographical location of consumer 148 utilizing location unit 112, and to display an information pane corresponding to the selected movie content and including selectable display features, such as icons, toolbars, or radio buttons, for example, indicating the distribution status of the movie. Alternatively, data related to consumer 148 may be historical data of previous selections by consumer 148, or preference settings previously chosen by consumer 148 and enabling content discovery application 120 to simplify discovery of content by consumer 148 without requiring any additional inputs by consumer 148.

For instance, if consumer 148 has previously established a preference for animated movie classics, or if consumer 148 affirmatively provides an input selecting a thumbnail corresponding to the movie "The Princess and the Frog," an information pane for "The Princess and the Frog" might be displayed to consumer 148. Such an information pane may include a display feature indicating that the movie content is available as a media content, as well as perhaps a display feature indicating that movie is available as an event performance, such as an in-theater screening of the film for a live audience. In response to an input from consumer 148 selecting one of the display features indicating a particular distribution status, content discovery application 120 may then identify a provider for that combination of content and state of availability, for example, according to the location of consumer 148.

The feature "distribution status," as used herein to characterize embodiments of the present invention, may embrace the release window of the content, the distribution form of the content, the distribution format of the content, availability of the content according to one or more time windows, and availability of the content according to geographical location, for example. Using the example of feature film or movie content for the purposes of illustration, a release window for the content may comprise a theatrical release window during which the content may be available only as an event performance such as an in-theater screening. In addition, release windows for film or movie content may include a pay-per-view (PPV) release window and a home entertainment release window, for example. Moreover, in some embodiments the release windows may be cumulative, such that a release window providing a more general release than its predecessor also includes the release to which its predecessor was limited. For instance, movie or film content available in a home entertainment release window as physical or digital media content, may also concurrently be available as PPV content available over a network and as event performance content in the form of an in-theater screening.

The distribution form of the content refers to the manner in which a consumer may acquire or experience the content. For example, distribution forms for movie or film content may include "available as an event performance," e.g., in-theater screening, or "available as media content," e.g., content stored and distributed as a digital stream, digital media file transfer, or content recorded and distributed on a physical media such as an optical disc. The distribution format of the content refers to alternatives within a distribution form. Thus, a distribution format for media content may be one of Digital Video Disc (DVD), Blu-ray, or digital download, for example.

As noted above, the distribution status may also correspond to the availability of the content during a particular time window. For example, the distribution status may reflect whether the content is presently available, that is to say available now in real time to the consumer, or whether although presently unavailable, e.g., unreleased or between release windows, the content will become available to the consumer in the future. In addition, the geographical location of the consumer may affect the distribution status of the media content with respect to a particular consumer. Consequently, in some embodiments, the distribution status of content may be determined in a personalized way for the consumer according to his or her geographical location.

To continue with the specific example introduced above with reference to FIG. 1, if consumer 148 were to select the distribution form "available as an event performance", content discovery application 120 might identify local or regional venues at which such event performances are scheduled to occur. In addition, in some embodiments, content discovery application 120 may also provide address and telephone information, Uniform Resource Identifier (URI) data such as a Uniform Resource Locator (URL), or other contact information for the identified providers, as well as perhaps pricing information and/or the dates and times of scheduled performances, as kept up-to-date by aggregator 114. For example, in one embodiment, consumer 148 may be redirected to a website of a provider to facilitate acquisition of a desired content unit from the provider. It is noted that although in some embodiments an identified provider of the content unit may be a third party commercial provider, e.g., a "big box" commercial retailer or online equivalent, in some embodiments, system 100 may be configured and provisioned to act itself as the provider. As may be evident from the above example, in other embodiments, content discovery application 120 may be configured to provide analogous content discovery services to consumer 148 for other types of content, such as literary content, game content, and music content, for example. More generally, content discovery application can be configured to provide content discovery services to consumer 148 for any rich media content.

As shown in FIG. 1, content discovery application 120 may be accessed through network 118. In that instance, content discovery application 120 may comprise a web application, accessible over a packet network such as the Internet, and configured to execute as a server based application on server 110, for example. Alternatively, content discovery application 120 may reside on a server supporting a local area network (LAN), or be included in another type of limited distribution network. In another embodiment, content discovery application 120 may be stored on a computer-readable storage medium such as a computer hard-drive, computer based random-access memory (RAM), or a portable memory device such as a compact disc read-only memory (CD-ROM) or external Universal Serial Bus (USB) connected memory, for example.

Turning now to FIG. 2, FIG. 2 shows a more detailed embodiment of system 200 for simplifying discovery of content availability for a consumer. System 200 in FIG. 2 includes client computer 240 interactively coupled to server 210 over communication link 218. Server 210 is shown to comprise optional location unit 212, aggregator 214, content discovery application 220a, and content availability database 230 including content records 232 and 234. Server 210, location unit 212, aggregator 214, content discovery application 220a, and content availability database 230 including content records 232 and 234 correspond respectively to server 110, location unit 112, aggregator 114, content discovery application 120, and content availability database 130 including content records 132 and 134, in FIG. 1. Moreover, client computer 240, in FIG. 2, corresponds to client computer 140, in FIG. 1. As shown in FIG. 2, client computer 240 comprises controller 242, web browser 244, and client memory 246. Also shown in FIG. 2 is content discovery application 220b.

According to the embodiment shown in FIG. 2, content discovery application 220b is located in client memory 246, having been received from server 210 via communication link 218. In the present embodiment, communication link 218 can represent download of content discovery application 220b, over a packet network, for example. In another embodiment, communication link 218 may represent transfer of content discovery application 220b from a CD-ROM or other computer-readable storage medium. Once transferred, content discovery application 220b may be stored in client memory 246 and executed locally on client computer 240, as a desktop application, for example. It is noted that communication link 218 is shown as a two-way communication, to represent ongoing communication between client computer 240, location unit 212, and content availability database 230.

Controller 242 may be the central processing unit for client computer 240, for example, in which role controller 242 runs the client computer operating system, launches web browser 244, and facilitates use of content discovery application 220b. Web browser 244, under the control of controller 242, may execute content discovery application 220b to enable filtering and selection of content records 232 and 234 stored on content availability database 230.

The systems shown in FIG. 1 and FIG. 2 may be used to enable a consumer to filter content records so as to ascertain the distribution status of a desired content unit. Various embodiments of the present invention providing that functionality will now be further described by reference to FIGS. 3A, 3B, 4A, 4B, and 5, in addition to the systems embodied in FIGS. 1 and 2. FIGS. 3A, 3B, 4A, and 4B show respective visual frames 300A, 300B, 400A, and 400B including various display features appearing on an information pane corresponding to a content record selected by consumer 148, according to embodiments of the present invention. Visual frames 300A, 300B, 400A, and 400B may be displayed on either or both of client computers 140 and 240, shown in respective FIGS. 1 and 2. It is noted that although for clarity of presentation, portions of the following description focus on one or the other of the systems shown by FIGS. 1 and 2, both systems are capable of simplifying discovery of content availability for a consumer, such as consumer 148 in FIG. 1, in the manner described.

Figure 5:
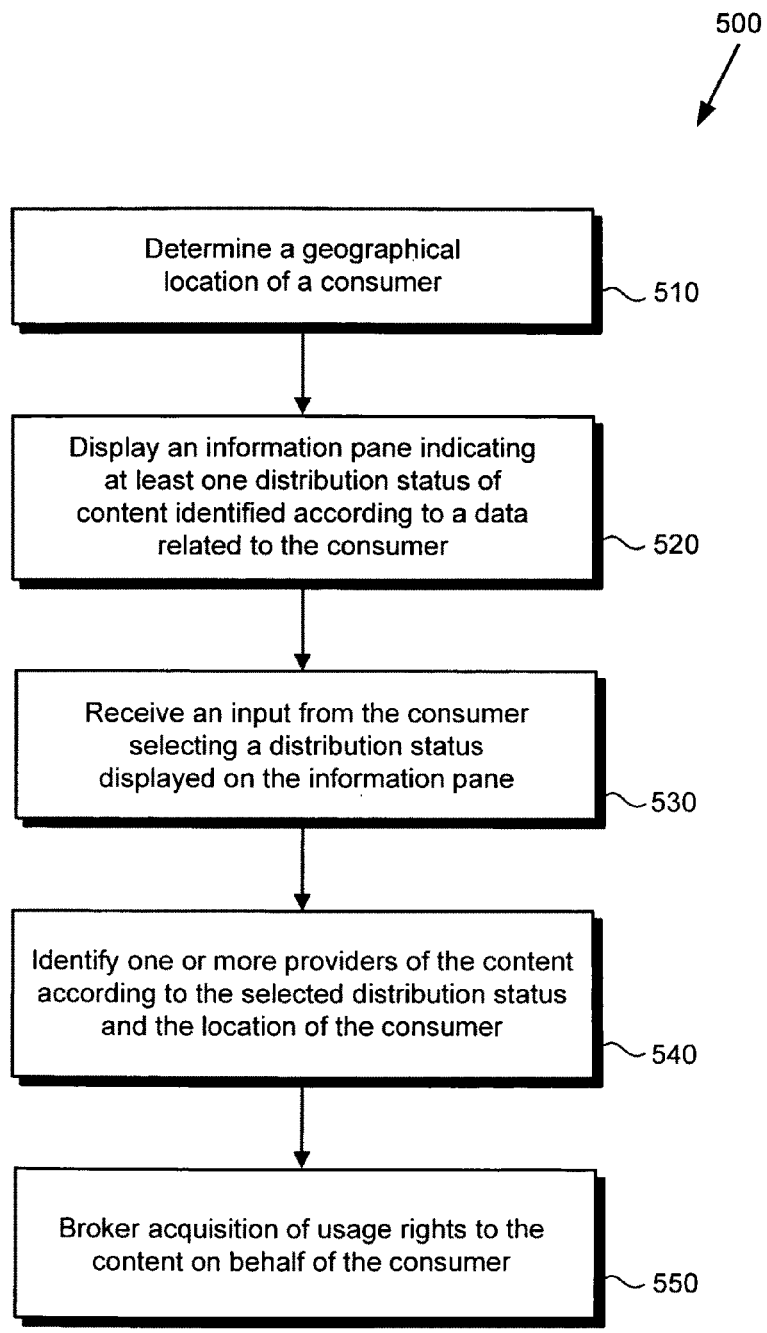
FIG. 5 is a flowchart presenting a method for simplifying discovery of content availability for a consumer, according to one embodiment of the present invention.

FIG. 5 shows flowchart 500 describing the steps, according to one embodiment of the present invention, of a method for simplifying discovery of content availability for a consumer. Certain details and features have been left out of flowchart 500 that are apparent to a person of ordinary skill in the art. For example, a step may comprise one or more substeps or may involve specialized equipment or materials, as known in the art. While steps 510 through 550 indicated in flowchart 500 are sufficient to describe one embodiment of the present method, other embodiments may utilize steps different from those shown in flowchart 500, or may include more, or fewer steps.

By way of setting the stage for performance of the method described by flowchart 500, let us assume a consumer, such as consumer 148, in FIG. 1, using client computer 140 to ascertain a distribution status of a desired content in the form of a feature film. The feature film of interest to consumer 148 may be a recently released feature film presently showing in theaters only, for example, or a previously released feature film now available as a media content recorded on a DVD or Blu-ray disc, or available as a digital media file download or media stream, for example. Alternatively, the feature film may be available as media content, but due to renewed interest in the film—perhaps resulting from an award nomination—has been re-released for in-theater screening.

Consumer 148 utilizing client computer 140 may access content discovery application 120 in the course of searching for desired content online. As shown in FIG. 2, the content discovery application may be used as a server based application such as content discovery application 220a, or as client-side content discovery application 220b. In searching for desired content, consumer 148 may be presented with a display of selectable images corresponding to individual feature films, for example an inventory array of selectable graphical representations corresponding to a plurality of content records including up-to-date metadata describing availability of the respective feature films. The displayed graphical representations can be arranged in any number of ways on a display device, such as a computer or mobile device display screen, for example, and may appear as a grid pattern interface, as a cover-flow interface, a three-dimensional interface, a tabbed interface, or any other presentation interface.

Referring to step 510 in FIG. 5 in conjunction with system 100, in FIG. 1, step 510 of flowchart 500 comprises determining a geographical location of consumer 148. Step 510 may be performed by content discovery application 120 in combination with location unit 112. More generally, step 510 corresponds to determining a geographical location associated with consumer 148, such as a location corresponding to the Internet Protocol (IP) address of client computer 140 on network 118, for example. Step 510 may be performed by any suitable means for locating consumer 148, as known in the art, such as correlating the IP address of client computer 140 with a particular city, state, and region, for example, or performing a reverse Global Positioning System (reverse GPS) search when client computer 140 comprises a GPS compatible device, such as a suitably equipped mobile communication device or tablet computer. Moreover, it is noted that step 510 is entirely optional, and in some embodiments, a method for simplifying discovery of content availability for a consumer may proceed with indifference to the geographical location of the consumer. For example, some methods directed to simplifying discovery of content availability exclusively or substantially exclusively from online vendors may ignore the geographical location of the consumer when determining the distribution status of content units.

The example method of flowchart 500 continues with step 520, which comprises displaying an information pane corresponding to a content record selected according to a data related to consumer 148. As previously explained, the data related to consumer 148 may be supplied by an input provided by consumer 148, or it may comprise historical data related to consumer 148 or preference settings previously selected by consumer 148. For example, in one embodiment, the data related to consumer 148 may be an content availability date input by consumer 148, such as the present date for content available currently available, or a future date for content that will be available on that input future date and may or may not be available at the present time. In one embodiment, the information pane includes one or more selectable display features consistent with and indicating a distribution status of the feature film content corresponding to the content record selected by or on behalf of consumer 148. Step 520 may be performed by content discovery application 120 in coordination with content availability database 130, for example.

Figure 3B:
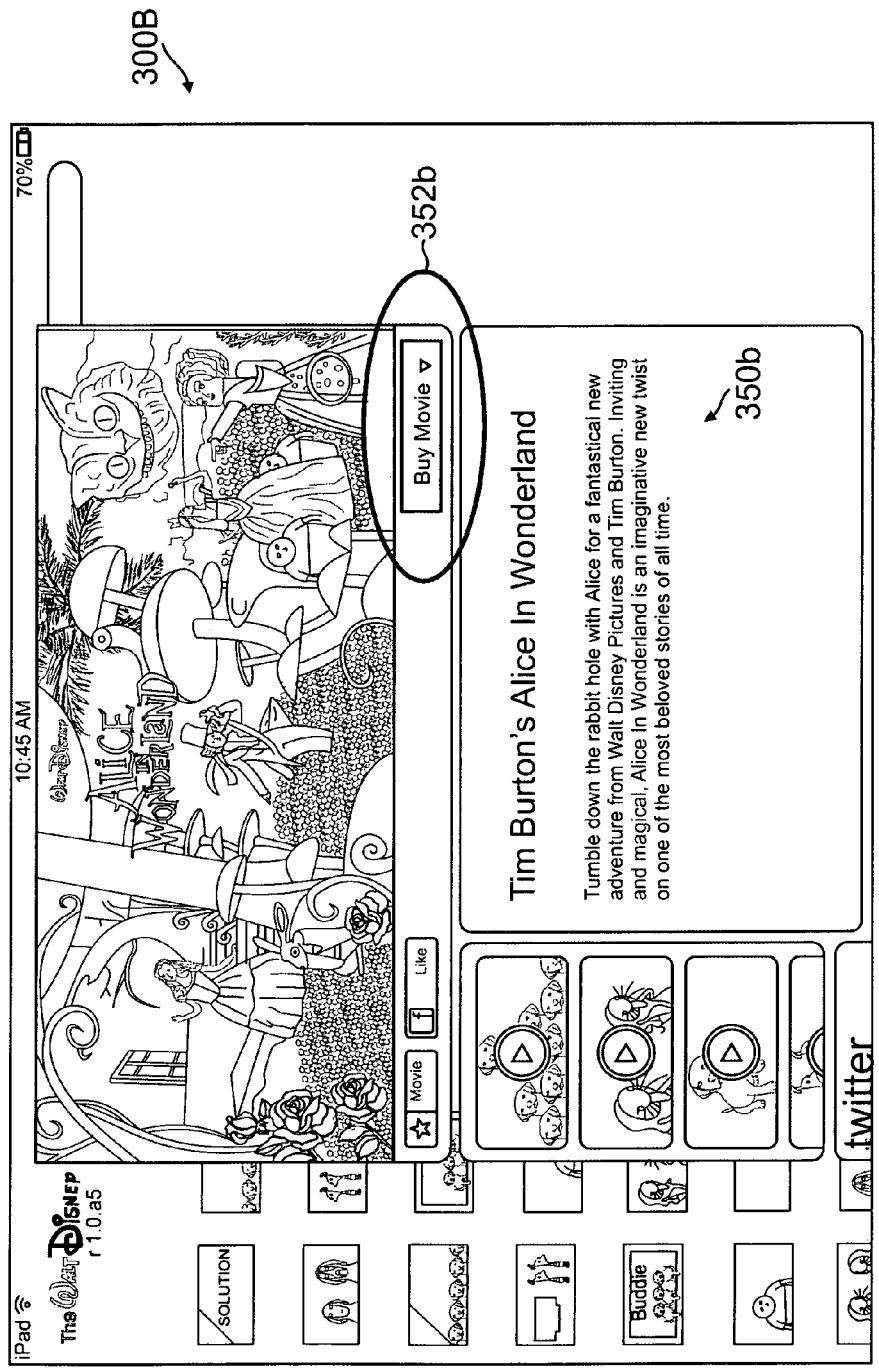
FIG. 3B shows a visual frame depicting an exemplary content information pane including a display feature indicating a distribution status of the content, according to one embodiment of the present invention.

FIGS. 3A and 3B show respective visual frames 300A and 300B depicting examples of an information pane displayed in step 520 for the feature film "Alice in Wonderland", according to an embodiment of the present invention. FIG. 3A may be seen to depict the details for "Alice in Wonderland" while the movie is available in a theatrical release window as an event performance, e.g., wherein the film is screened for a live audience in-theater, while FIG. 3B may be seen to depict the details for "Alice in Wonderland" while the feature film is available in a home entertainment release window and acquirable as a media content.

It is noted that the selectable display features 352a and 352b indicating the distribution status of "Alice in Wonderland" may be changed dynamically based on the particular release window or windows occupied by the selected feature film, as well as, in the present embodiment, according to the geographical location of consumer 148. In particular, the action that may be taken with respect to consuming the movie content may be changed, as seen by selectable display feature 352a comprising a "Find a Theater" button for event performance availability of the feature film as shown in FIG. 3A, and selectable display feature 352a comprising a "Buy Movie" button for media content availability of the feature film in FIG. 3B. In cases in which a feature film concurrently occupies more than one release window or occupies a cumulative release window, and thereby is characterized by multiple availability states, all selectable display features indicative of the various states of availability of the feature film may be displayed on the same information pane. Alternatively, in some embodiments, consumer 148 may be permitted to filter the options displayed in the information pane according to his or her preferences. Thus, regardless of the particular distribution status of the feature film, consumer 148 can ascertain all, or a preferred subset, of the ways in which the desired feature film content can be enjoyed.

Flowchart 500 continues with step 530, which comprises receiving an input from consumer 148 selecting one of the selectable display features indicating a particular distribution status of the desired content. Continuing with the specific example introduced above, step 530 corresponds to selection by consumer 148 of one of selectable display features 352*a* and 352*b* shown in respective information panes 350*a* and 350*b*. Step 530 can be performed by content discovery application 120 in response to an input by consumer 148 to client computer 140, for example.

Moving on to step 540 of flowchart 500, step 540 comprises identifying one or more providers of the desired content according to the selected distribution status. Step 540 may be performed by content discovery application 120, for example, and may comprise displaying one or more additional selectable display features to assist consumer 148 in accessing or acquiring the desired content. In one embodiment, identifying a provider of the desired content may include providing an address of the provider, such as the URL of an online retailer of media content, a geographical address and telephone number of a brick-and-mortar retail outlet, or a geographical address and telephone number of a physical venue for an event performance. More generally, the term "address", as used herein, may refer to the region, state, or area, such as a zip code designated area, rather than to an exact address such as a street address. As previously mentioned, in one embodiment, consumer 148 may be redirected to a website of a provider to facilitate acquisition of the desired content unit from the provider. Moreover, it is reiterated that although in some embodiments an identified provider of the content unit may be a third party commercial provider, e.g., a "big box" commercial retailer or online equivalent, in some embodiments, system 100 may be configured and provisioned to act as the provider.

In some embodiments, identifying a provider in step 540 may include displaying a cost or costs associated with acquiring the various respective usage rights available from the provider. For example, depending on the distribution status of the content, a usage right acquirable by use 148 may include a right of admission to an event performance, or an ownership, licensing, rental, or subscription right to a physical or digital media including the desired content unit. In addition, in embodiments in which the geographical location of consumer 148 is identified through step 510, step 540 may include identifying a suitable provider or providers of the desired content according to that geographical location.

Alternatively, content that is not presently available to the consumer is sought by the consumer, other embodiments of the present method and system may provide information regarding availability of the content unit according to the selected distribution status. For example, provider information may be unavailable for content that is presently not available to consumers despite that content having a planned future availability date. In such circumstances, the present inventive principles may include providing whatever information regarding future availability of the content exists, such as a location at which the content will be available, provider information if known, the cost of the content, and the future availability date of the content, for example. For example, when the desired feature film "Alice in Wonderland" is in a theatrical release window, as indicated by FIG. 3A, consumer 148 may be provided with a drop-down menu detailing movie screening venues local to consumer 148 and perhaps movie ticket prices, when selectable display feature 352*a* indicating the distribution status available as an in-theater event performance is selected. Alternatively, when the feature film is available as a media content, as in FIG. 3B, consumer 148 may be provided with media format and/or media purchase options when selectable display feature 352*b* is clicked or otherwise selected.

Figure 4A:
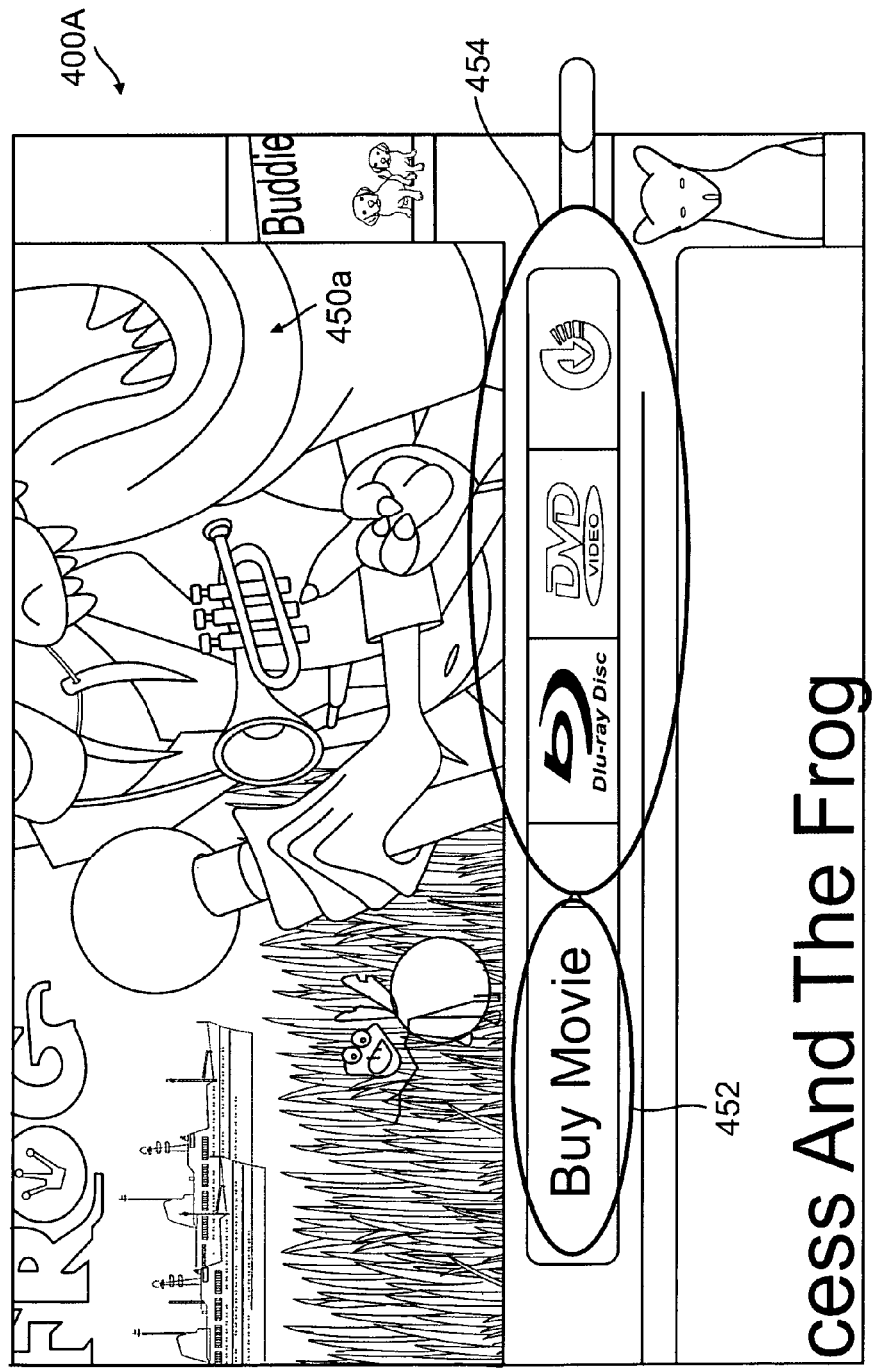
FIG. 4A shows a visual frame depicting an exemplary content information pane including another display feature indicating available media formats for content available as media content, according to one embodiment of the present invention.
Figure 4B:
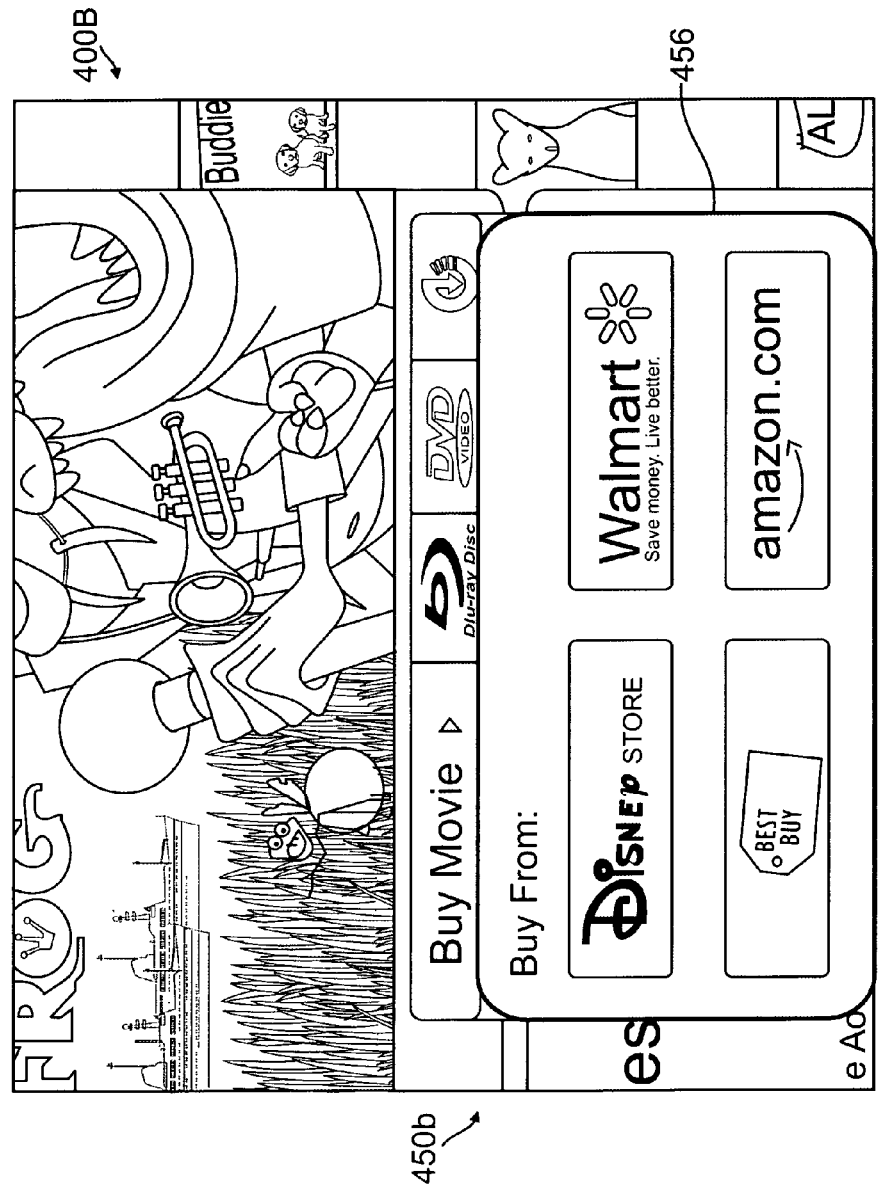
FIG. 4B shows a visual frame depicting an exemplary content information pane identifying providers of a media content format selected by a consumer, according to one embodiment of the present invention.

Referring now to FIGS. 4A and 4B, respective visual frames 400A and 400B depict information panes showing details for the feature film "The Princess and the Frog", according to an embodiment of the present invention. For example, in some embodiments, as shown for example by FIG. 4A, after consumer 148 selects "Buy Movie" selectable display feature 452 shown in information pane 450*a*, media format option bar 454 may appear in the information pane. As shown by media format option bar 454, icons depicting three different available media formats, including physical media on Blu-ray disc, physical media on DVD, and digital media download are displayed to consumer 148. It is noted, however, that other embodiments may provide different media format options. Moreover, although media format option bar 454 displays all three icons as presently selectable, in situations where, for example, the Blu-ray disc is scheduled for later retail release than the DVD, the Blu-ray disc icon may be visually de-emphasized by being grayed-out or hidden from consumer 148 if the Blu-ray disc is presently unavailable in retail channels. Thus, only options that are presently available to the public, or more specifically, available to consumer 148 taking into consideration the geographical location associated with consumer 148, are actively displayed to consumer 148.

Continuing to FIG. 4B, and assuming that consumer 148 has decided to acquire the DVD version of the feature film, the DVD icon may be selected, through being highlighted, or as a rollover for example, as shown by information pane 450*b* of visual frame 400B, and provider selector 456 may be displayed to identify providers, such as retailers, from which an authorized DVD recording of "The Princess and the Frog" may be purchased. Thus, after parsing of up-to-date associated retailer metadata, consumer 148 may be redirected to retailers that are confirmed to carry stock of the desired product, in this example the DVD version of "The Princess and the Frog". Furthermore, as shown by each of FIGS. 3A, 3B, 4A, and 4B, in addition to distribution status, media format options, and provider identification, other attributes of the content, e.g., feature film, may be modified and used in respective information panes 340*a*, 350*b*, 340*a*, and 450*b*, such as movie artwork, bonus content, description, and other properties.

Referring again to FIG. 5, as shown by step 550 of flowchart 500, in some embodiments a method for simplifying discovery of content availability for a consumer may further comprise brokering acquisition of a usage right on behalf of the consumer. Step 550 may be performed by content discovery application 120, and may include acquisition of one or more admissions to an event performance, or ownership, licensing, rental, or subscription rights to a physical or digital media content, for example, on behalf of consumer 148.

Thus, embodiments of the present invention simplify the complexity of discovering and ascertaining the local availability of content such as literary content, music content, and feature films, thereby enabling consumers to enjoy a streamlined search and discovery experience, regardless of the particular release window the content may presently occupy. Moreover, in embodiments in which an additional brokering option is provided, the present inventive concepts can be implemented so as to advantageously provide a seamlessly integrated consumer resource by which desired content can be discovered, its local distribution status ascertained, and acquisition of a right to consume the desired content may be reserved or acquired.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method for use by a system for discovery of content availability for a consumer, the method comprising:
   receiving a selection of a movie and a selection of a future date from the consumer, wherein the movie is selected from a plurality of movies, and wherein the selections are made via a user interface of a client computer;
   determining, in response to the selection of the movie by the consumer from the plurality of movies, a distribution status for the movie based on availability according to a current geographical location of the consumer and availability according to the future date falling within one or more of a plurality of release windows stored in a plurality of content records corresponding to the movie, each of the plurality of release windows indicative of one of a plurality of distribution release forms of the movie;
   displaying, after the determining, an information pane corresponding to each of the plurality of content records having the one or more of the plurality of release windows covering the future date, the information pane including a selectable display feature for each of the plurality of content records having the one or more of the plurality of release windows covering the future date, the selectable display feature indicating the distribution status of the movie including a corresponding distribution release form of the movie;
   receiving, via the user interface of the client computer, an input from the consumer selecting one of the at least one selectable display features indicating the distribution status for the movie; and
   identifying at least one provider of the movie according to the selected distribution status, the future date, and the current geographical location of the consumer wherein the provider is one of a venue and a retailer.

2. The method of claim 1, wherein the release window is one of a theatrical release window, a pay-per-view (PPV) release window, and a home entertainment release window.

3. The method of claim 1, wherein the distribution form is one of: available as a media content and available as an event performance.

4. The method of claim 3, wherein available as a media content comprises at least one of: available as a physical media and available as a digital media.

5. The method of claim 1, wherein the at least one provider of the movie comprises a third party provider of the movie.

6. The method of claim 1, wherein identifying the at least one provider comprises re-directing the consumer to one of an online or a physical destination managed by the at least one provider.

7. The method of claim 1, the distribution form comprising available as an event performance, and identifying the at least one provider comprises identifying a geographical address and telephone number of a venue of the event performance.

8. The method of claim 1, the distribution form comprising available as a media content, and wherein the method further comprises displaying at least one selectable media format option as another selectable display feature of the information pane.

9. The method of claim 1, wherein the displaying of the information pane is further based on data related to the consumer including one of a historical data of previous selections by the consumer, preference data chosen by the consumer, and a present input provided by the consumer.

10. The method of claim 1, wherein identifying the at least one provider comprises displaying a cost of acquiring a usage right associated with the movie from the at least one provider.

11. The method of claim 10, wherein the usage right is one of a right of admission to an event performance, and an ownership, licensing, rental, or subscription right to a physical or digital media including the movie.

12. The method of claim 10, further comprising brokering acquisition of the usage right on behalf of the consumer.

13. A system for discovery of content availability for a consumer using a content availability database accessible through a server, the content availability database storing content records corresponding to a plurality of movies, the system comprising:
   a user interface of a client computer; and
   a central processing unit configured to execute a content discovery application to utilize the content availability database and a location unit for discovery of content availability for the consumer, by:
      receiving a selection of a movie and a selection of a future date from the consumer, wherein the movie is selected from a plurality of movies, and wherein the selections are made via the user interface;
      determining, in response to the selection of the movie by the consumer from the plurality of movies, a distribution status for the movie based on availability according to a current geographical location of the consumer and availability according to the future date falling within one or more of a plurality of release windows stored in a plurality of content records corresponding to the movie, each of the plurality of release windows indicative of one of a plurality of distribution release forms of the movie;
      displaying, after the determining, an information pane corresponding to each of the plurality of content records having the one or more of the plurality of release windows covering the future date, the information pane including a selectable display feature for each of the plurality of content records having the one or more of the plurality of release windows covering the future date, the selectable display feature indicating the distribution status of the movie including a corresponding distribution release form of the movie;

receiving, via the user interface, an input from the consumer selecting one of the at least one selectable display features indicating the distribution status for the movie; and identifying at least one provider of the movie according to the selected distribution status, the future date, and the current geographical location of the consumer, wherein the provider is one of a venue and a retailer.

14. The system of claim 13, wherein the release window is one of a theatrical release window, a pay-per-view (PPV) release window, and a home entertainment release window.

15. The system of claim 13, wherein the distribution form is one of: available as a media content and available as an event performance.

16. The system of claim 15, wherein available as a media content comprises at least one of: available as a physical media and available as a digital media.

17. The system of claim 13, wherein the at least one provider of the movie comprises a third party provider of the movie.

18. The system of claim 13, wherein identifying the at least one provider comprises re-directing the consumer to one of an online or a physical destination managed by the at least one provider.

19. The system of claim 13, the distribution form comprising available as an event performance, and identifying the at least one provider comprises identifying a geographical address and telephone number of a venue of the event performance.

20. The system of claim 13, the distribution form comprising available as a media content, and wherein the content discovery application is further configured to display at least one selectable media format option as another selectable display feature of the information pane.

21. The system of claim 13, wherein the displaying of the information pane is further based on data related to the consumer including one of a historical data of previous selections by the consumer, preference data chosen by the consumer, and a present input provided by the consumer.

22. The system of claim 13, wherein identifying the at least one provider comprises displaying a cost of acquiring a usage right associated with the movie from the at least one provider.

23. The system of claim 22, wherein the usage right is one of a right of admission to an event performance, and an ownership, licensing, rental, or subscription right to a physical or digital media including the movie.

24. The system of claim 22, wherein the content discovery application is further configured to broker acquisition of the usage right on behalf of the consumer.

\* \* \* \* \*